(12) United States Patent
Mustafa et al.

(10) Patent No.: US 11,598,454 B2
(45) Date of Patent: Mar. 7, 2023

(54) APPARATUS AND METHODS TO PREVENT PARTICLE ENTRY INTO GAS LINES

(71) Applicant: Applied Materials, Inc., Santa Clara, CA (US)

(72) Inventors: Muhannad Mustafa, Milpitas, CA (US); Muhammad M. Rasheed, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 114 days.

(21) Appl. No.: 16/750,595

(22) Filed: Jan. 23, 2020

(65) Prior Publication Data
US 2021/0231242 A1    Jul. 29, 2021

(51) Int. Cl.
  *F16L 19/02*   (2006.01)
  *F16L 19/025*   (2006.01)

(52) U.S. Cl.
  CPC ......... *F16L 19/0218* (2013.01); *F16L 19/025* (2013.01)

(58) Field of Classification Search
  CPC .............................. F16L 19/025; F16L 19/0231
  USPC ................................................. 285/387, 388
  See application file for complete search history.

(56) References Cited

U.S. PATENT DOCUMENTS

| | | | | |
|---|---|---|---|---|
| 473,462 A * | 4/1892 | Hogan | ............... | F16L 19/0231 285/384 |
| 932,805 A * | 8/1909 | McLaughlin | ....... | F16L 19/0225 285/332 |
| 1,244,100 A * | 10/1917 | Kortas | ............... | F16B 37/0864 411/433 |
| 2,366,341 A * | 1/1945 | Lappin | ................. | F16L 55/168 285/337 |
| 3,428,337 A * | 2/1969 | Read | .................... | F16L 19/0231 285/18 |
| 3,689,110 A * | 9/1972 | Ferguson | ............... | F16L 21/06 285/15 |
| 4,728,130 A * | 3/1988 | Corzine | ............. | F16L 19/0231 285/318 |
| 4,784,412 A * | 11/1988 | Van Dongen | ...... | F16L 19/0231 285/133.4 |
| 4,810,010 A * | 3/1989 | Jones | ...................... | F16C 3/026 285/222.4 |
| 4,924,569 A * | 5/1990 | Kennedy | ................ | F25B 41/40 29/890.14 |
| 5,022,684 A * | 6/1991 | Eagon | .................... | F16L 55/17 285/12 |
| 5,088,771 A * | 2/1992 | Hosseinian | ............ | B25B 27/10 285/382.2 |

(Continued)

FOREIGN PATENT DOCUMENTS

CN    301666113 S    9/2011
CN    301994153 S    7/2012

(Continued)

*Primary Examiner* — David Bochna
(74) *Attorney, Agent, or Firm* — Servilla Whitney LLC (57) ABSTRACT

Connector assemblies for holding two tubes together and methods of use are described. The connector assemblies have an inner bolt, a split outer bolt comprising at least two outer bolt sections and a clamp bolt. The clamp bolt holds the outer bolt sections together to form the split outer bolt and the inner bolt is screwed into the outer bolt to enclose the two tube ends.

18 Claims, 5 Drawing Sheets

(56) References Cited

U.S. PATENT DOCUMENTS

| | | | | |
|---|---|---|---|---|
| 5,226,678 A | * | 7/1993 | Petranto | F16L 19/0231 |
| | | | | 285/334.5 |
| 5,636,876 A | * | 6/1997 | Eidsmore | F16L 19/025 |
| | | | | 285/39 |
| 6,318,766 B1 | * | 11/2001 | Babuder | F16L 19/0218 |
| | | | | 285/328 |
| D721,562 S | | 1/2015 | Battenfeld | |
| 2012/0174895 A1 | | 7/2012 | Rabhi | |
| 2018/0155826 A1 | | 6/2018 | Khan | |

FOREIGN PATENT DOCUMENTS

| | | |
|---|---|---|
| CN | 303070790 S | 1/2015 |
| CN | 305237482 S | 6/2019 |

* cited by examiner

APPARATUS AND METHODS TO PREVENT PARTICLE ENTRY INTO GAS LINES

TECHNICAL FIELD

Embodiments of the present disclosure pertain to tube connections and methods to connect tube ends. In particular, embodiments of the disclosure provide connector assemblies and methods for connecting gas lines for semiconductor manufacturing.

BACKGROUND

Standard variable compression ratio (VCR) fittings are coated with silver to prevent galling due to surface reaction between similar materials. Galling is the wearing or rubbing of the components causing a microscopic transfer between two surfaces of similar material during sliding or transverse motion. The rate of molecular transfer increases with increased temperatures. Galling is believed to be due to friction caused by materials surface tension heating adjacent surfaces into a single material. During connecting/disconnecting of fittings to join gas lines, silver particles are loosened and diffuse into the gas lines. These particles can be difficult to purge out of the system and have been observed on the wafer during processing.

Most VCR fittings are coated with special materials (e.g., silver, cobalt, chromium) to prevent galling in high temperature vacuum applications. These materials add to the cost and complexity of the fittings. Accordingly, there is a need in the art for new fittings to join gas lines.

SUMMARY

One or more embodiments of the disclosure are directed to connector assemblies comprising an inner bolt, a split outer bolt and a clamp bolt. The inner bolt has a proximal end and a distal end defining an inner bolt length, and an outside surface. An opening extends from the proximal end to the distal end. The opening has an inside surface. Screw threads are on the outside surface and extend a screw thread length from a proximal thread end to a distal thread end. The split outer bolt comprises at least two outer bolt sections configured to form a cylindrical bolt with an inside surface and an outside surface. Each of the bolt sections has a bolt section proximal end and a bolt section distal end defining a bolt section length, a bolt section inside surface and a bolt section outside surface. Bolt section inner screw threads are on the bolt section inside surface. The bolt section inner screw threads are configured to form inner screw threads on the inside surface of the split outer bolt that are configured to cooperatively interact with the screw treads on the outside surface of the inner bolt. The clamp bolt is configured to cooperatively interact with the outside surface of the split outer bolt to hold the at least two outer bolt sections together to form the cylindrical bolt.

Additional embodiments of the disclosure are directed to connector assemblies comprising an inner bolt, a split outer bolt and a clamp bolt. The inner bolt has a proximal end and a distal end defining an inner bolt length, and an outside surface. An opening extends from the proximal end to the distal end. The opening has an inside surface. Screw threads are on the outside surface extending a screw thread length from a proximal thread end to a distal thread end. The inside surface has an inner wall adjacent the proximal end in an inner wall region. The inner wall is angled relative to the inside surface so that a diameter of the opening within the inner wall region is smaller than an inner diameter of the opening distal to the inner wall region. The split outer bolt comprises at least two outer bolt sections configured to form a cylindrical bolt with a continuous inside surface and an outside surface. Each of the bolt sections has a bolt section proximal end and a bolt section distal end defining a bolt section length, a bolt section inside surface and a bolt section outside surface. Bolt section inner screw threads are on the bolt section inside surface. The bolt section inner screw threads are configured to form inner screw threads on the inside surface of the split outer bolt that are configured to cooperatively interact with the screw treads on the outside surface of the inner bolt. The clamp bolt is configured to cooperatively interact with the outside surface of the split outer bolt to hold the at least two outer bolt sections together to form the cylindrical bolt.

Further embodiments of the disclosure are directed to methods of connecting tubes. At least two outer bolt sections are positioned around an end of a first tube and end of a second tube. The outer bolt sections are configured to form a continuous inside surface with inner screw threads. A clamp bolt is positioned around a proximal end portion of the outer bolt sections to form the split outer bolt. An inner bolt around the end of the second tube is screwed into the split outer bolt to clamp an end flange of the first tube to an end flange of the second tube.

BRIEF DESCRIPTION OF THE DRAWING

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments. The embodiments as described herein are illustrated by way of example and not limitation in the figures of the accompanying drawings in which like references indicate similar elements.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Embodiments of the disclosure are directed to fittings for coupling gas lines. Some embodiments advantageously provide fittings that prevent galling in high temperature vacuum applications. Some embodiments provide separable nuts which are bolted together with a locking nut. In some embodiments, the two-piece (or more) nut moves the threaded region away from the gas line opening to prevent particles falling into the tubing. In some embodiments, a male nut is designed as longer in length to move the threaded are away from the gas line opening.

Figure 1:
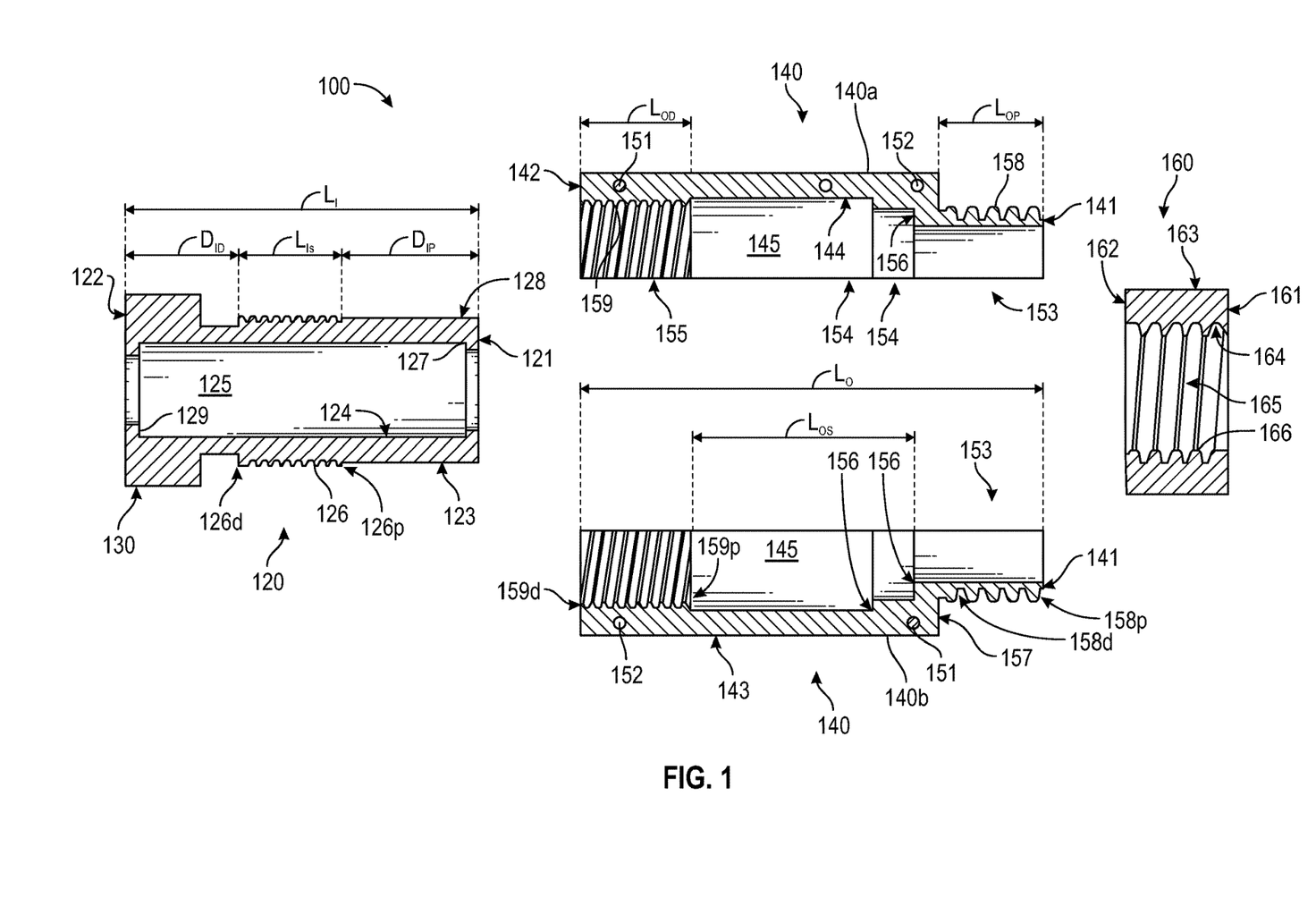
FIG. 1 illustrates a cross-sectional exploded view of a connector assembly according to one or more embodiment of the disclosure.

Referring to FIG. 1, one or more embodiments of the disclosure are directed to connector assemblies 100. The assembly 100 illustrated in FIG. 1 is a cross-sectional view of a multi-component coupling housing that is assembled around the intersection of two gas lines. The connector assembly 100 of some embodiments provides a directed force to the gas line fittings in the direction of the end of the gas line. With the force directed toward the end of the gas lines, two gas line ends are pressed together to create the coupling.

The connector assembly comprises an inner bolt 120 and a split outer bolt 140. A clamp bolt 160 contacts the outer bolt sections 140a, 140b to hold the outer bolt sections 140a, 140b together. The use of the terms "bolt" and "clamp" are for descriptive purposes and should not be taken as limiting the scope of the disclosure. The term "bolt" is used to describe a component that fits around a gas line and is configured to contact an end fitting on the gas line. The term "clamp bolt" is used to describe a component that holds or clamps multiple bolt sections of a split bolt. The clamp bolt of some embodiments comprises a traditional nut with internal screw threads. However, the skilled artisan will recognize that the disclosure is not limited to traditional nuts.

The inner bolt 120 has a proximal end 121 and a distal end 122. The use of the terms "proximal" and "distal" are for purposes of indicating a side or end of a given component and does not imply a physical orientation relative to a user. The "proximal" and "distal" ends of the components are used consistently for each component relative to an assembled connector assembly 100. The proximal end 121 and distal end 122 define a length $L_I$ of the inner bolt 120. In some embodiments, the length $L_I$ of the inner bolt 120 is in the range of about 1 inch to about 6 inches, or in the range of about 2 inches to about 5 inches. In some embodiments, the length $L_I$ of the inner bolt 120 is greater than or equal to 1 inch.

The inner bolt 120 has an outside surface 123. The outside surface of some embodiments has a variable shape to include, for example, flanges and screw threads. An opening 125 extends from the proximal end 121 to the distal end 122 and is bounded by the inside surface 124 of the inner bolt 120. The inside surface 124 of some embodiments has a variable shape to include, for example, portions with smaller diameters or larger diameters along the length of the inner bolt 120. For example, the inner bolt 120 shown in FIG. 1 has an opening 125 with a smaller diameter at the end walls of the proximal end 121 and the distal end 122 than in a portion mid-way along the length of the inner bolt 120.

The outside surface 123 of the inner bolt includes screw threads 126. The screw threads 126 extend a screw thread length $L_{IS}$ on the outside surface 123 from a proximal thread end 126p to a distal thread end 126d. The length $L_{IS}$ of the screw threads 126 of some embodiments is in the range of about 10% to about 90% of the length $L_I$ of the inner bolt 120. The proximal thread end 126p of the inner bolt 120 of some embodiments is spaced a distance $D_{IP}$ from the proximal end 121 of the inner bolt 120. In some embodiments, the distance DIP is less than or equal to 10% of the length $L_I$ of the inner bolt 120 from the proximal end 121. In some embodiments, the distance $D_{IP}$ is greater than or equal to about 10% of the length $L_I$ from the proximal end 121. In some embodiments, the proximal thread end 126p of the inner bolt 120 is spaced a distance $D_{IP}$ from the proximal end 121 in the range of about 5% to about 50% of the length $L_I$ of the inner bolt 120. The distal thread end 126d of the inner bolt 120 of some embodiments is spaced a distance $D_{ID}$ from the distal end 122 of the inner bolt 120. In some embodiments, the distance $D_{ID}$ is greater than or equal to 10% of the length $L_I$ from the distal end 122. In some embodiments, the distal thread end 126d of the inner bolt 120 is spaced a distance $D_{IP}$ from the distal end 122 in the range of about 5% to about 50% of the length $L_I$ of the inner bolt 120. The skilled artisan will recognize that the distance $D_{IP}$ and distance $D_{ID}$ define the length $L_{IS}$ and that the distance $D_{IP}$ and distance $D_{ID}$ are sufficient to provide a length $L_{IS}$ of the screw threads 126 greater than or equal to 10% of the length $L_I$ of the inner bolt 120.

In some embodiments, the inside surface 124 of the inner bolt has an inner wall 127 adjacent the proximal end 121 in an inner wall region 128. The inner wall 127 is angled relative to the inside surface 124 so that an inner diameter of the opening 125 within the inner wall region 128 is smaller than the inner diameter of the opening 125 distal to the inner wall region 128. In the illustrated embodiment, the inner wall 127 has a surface inside of the opening 125 and a surface outside of the opening 125. The surface outside of the opening 125 is the proximal end 121 of the inner bolt 120. The inner wall region 128 is defined as the distance from the proximal end 121 to the inside surface of the inner wall 127. Stated differently, the inner wall region 128 is the portion of the outside surface 123 between the proximal end 121 and the surface of the inner wall 127 inside the opening 125. In some embodiments, the proximal end 121 of the inner bolt 120 has an opening that is the same diameter as the opening in the region of the screw threads 126.

In some embodiments, the inside surface 124 of the inner bolt 120 has an inner wall 129 adjacent the distal end 122 in a distal inner wall region 130. The inner wall 129 of some embodiments is angled relative to the inside surface 124 so that an inner diameter of the opening 125 within the distal inner wall region 130 is smaller than a diameter of the opening 125 proximal to the distal inner wall region 130.

In some embodiments, the proximal thread end 126p of the inner bolt 120 on the outside surface 123 is positioned distally relative to the inner wall region 128. In some embodiments, the distal thread end 126d of the inner bolt 120 on the outside surface 123 is positioned proximally relative to the distal inner wall region 130.

The split outer bolt 140 comprises at least two outer bolt sections 140a, 140b. For descriptive purposes the split outer bolt 140 has the features of the individual outer bolt sections 140a, 140b that combine to form the split outer bolt 140. The terms split outer bolt and outer bolt sections are used interchangeably in describing components or portions that are common to both. The outer bolt sections 140a, 140b are configured to form a split outer bolt 140 with a cylindrical inside surface 144. As used in this manner, the term "cylindrical" means a generally elongate circular cross-section between a proximal end 141 and distal end 142 of the split outer bolt 140. A cylindrical inside surface includes embodiments in which the diameter of the inside surface 144 of the opening 145 varies along the length (from proximal end 141 to distal end 142). The inside surface 144 illustrated in FIG. 1 includes a threaded portion 155 near the distal end 142 and a clamping region 153 near the proximal end 141 with varying diameter or steps. The inside surface 144 of the illustrated embodiment is considered cylindrical because the opening 145 that forms the inside surface 144 extends from the proximal end 141 to the distal end 142. In the illustrated embodiment, the outside surface 143 of the split outer bolt 140 has screw threads 158 in the clamping region 153.

The split outer bolt 140 can be made up of any suitable number of outer bolt sections 140a, 140b configured to form a continuous inside surface around an axis extending from the distal end 142 to the proximal end 141 of the split outer bolt 140. In the illustrated embodiment, two outer bolt sections 140a and 140b form the split outer bolt 140 when the edges of the sections are contacted. In some embodiments, there are more than two outer bolt sections so that the split outer bolt 140 is made up of three, four, five or six sections. Assembly of the split outer bolt 140 is more complicated for embodiments with increasing numbers of outer bolt sections. In the illustrated embodiment, the two halves of the split outer bolt 140 (each half being one of the outer bolt sections 140a, 140b) are connected to form the single split outer bolt 140.

In some embodiments, the outer bolt sections include one or more alignment feature to aid in aligning the surfaces of the sections. In the embodiment illustrated in FIG. 1, the alignment feature includes a protrusion 151 on one half of the mating surface and a recess 152 on the other half of the mating surface. The illustrated embodiment includes two alignment features; however, the skilled artisan will recognize that there can be any number or no alignment features.

The length $L_O$ of the split outer bolt 140, and the outer bolt sections that form the split outer bolt 140 is measured from the proximal end 141 to the distal end 142. The opening 145 in the split outer bolt 140 illustrated in FIG. 1 includes a plurality of regions: a proximal clamping region 153, at least one stepped region 154 (two are illustrated) and a distal threaded portion 155. In some embodiments, each of the stepped regions 154 includes a inner wall 156. The proximal clamping region 153 has a length $L_{OP}$ extending from the proximal end 141 to an inner wall 156. The stepped region 154 has a length $L_{OS}$ that extends from the inner wall 156 to an adjacent inner wall 156 or to a proximal end of the distal threaded portion 155.

In some embodiments, the split outer bolt 140 includes bolt section inner screw threads 159 on the inside surface 144 in the distal threaded portion 155. In some embodiments, the bolt section inner screw threads 159 are configured to form inner screw threads on the inside surface of the split outer bolt 140 that is configured to cooperatively interact with the screw threads 126 on the outside surface 123 of the inner bolt 120. As used in this manner, the term "cooperatively interact" means that the adjoining components are arranged or configured in a complementary manner so that the screw threads of one component can engage and move along the length of the screw threads of the other component. In some embodiments, the inner screw threads 159 extend from a distal thread end 159d to a proximal thread end 159p defining a length of the inner screw threads 159. The length of the inner screw threads 159 is a measure of the length of the distal threaded portion 155. In some embodiments, the distal thread end 159d is adjacent to the distal end 142 of the split outer bolt 140. As used in this manner, the term "adjacent" means that the component is immediately next to or in very close proximity to the stated component. For example, the distal thread end 159d of the inner screw threads 159 of some embodiments ends at the distal end 142 or within 5 mm of the distal end 142. However, the term "adjacent" is not limited to the 5 mm example.

In the illustrated embodiment, the clamp region 153 comprises bolt section outer screw threads 158 on the outside surface 143 of the split outer bolt 140. The bolt section outer screw threads 158 are configured to form outer screw threads on the outside surface of the split outer bolt 140 and the clamp bolt 160 comprises an opening 165 with an inner surface with inner screw threads 166 configured to cooperatively interact with the outer screw threads 158 on the outside surface 143 of the split outer bolt 140. In some embodiments, the outer screw threads 158 extend an outer screw thread length $L_{OP}$ from the proximal end 141 of the split outer bolt 140. Stated differently, in some embodiments the proximal outer screw thread end 158p is adjacent to the proximal end 141 of the split outer bolt 140. The outer screw thread length LOP is defined as the distance from the proximal outer screw thread end 158p to the distal outer screw thread end 158d.

In some embodiments, the inside surface 144 of the outer bolt sections 140a, 140b, and the split outer bolt 140, comprises an inner wall 156 spaced a distance from the proximal end 141 of the outer bolt section 140a, 140b and split outer bolt 140. The inner diameter of the opening 145 in the split outer bolt 140 is smaller proximal of the inner wall 156 than the diameter of the split outer bolt 140 distal to the inner wall 156.

In some embodiments, the outside surface 143 of the outer bolt sections 140a, 140b comprises an outer wall 157 spaced a distance from the proximal end 141 of the outer bolt sections 140a, 140b. The outer wall 157 has a surface facing the proximal end 141 of the split outer bolt 140 and outer bolt sections 140a, 140b. The distance from the proximal end 141 to the outer wall 157 is the length $L_{OP}$. The diameter of the split outer bolt 140 proximal the outer wall 157 is smaller than the outer diameter of the split outer bolt 140 distal of the outer wall 157. In some embodiments, the outer screw threads 158 extend from the proximal end 141 of the split outer bolt 140 to the outer wall 157.

Figure 2:
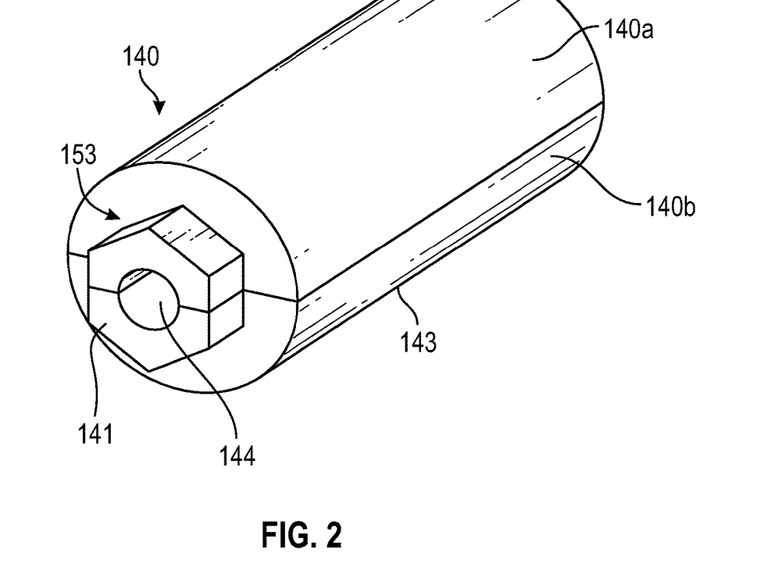
FIG. 2 illustrates an isometric view of split outer bolt of a connector assembly according to one or more embodiments of the disclosure.

The clamp bolt 160 has a proximal end 161 and a distal end 162 defining a length of the clamp bolt 160. The clamp bolt 160 is configured to cooperatively interact with the outside surface 143 of the split outer bolt 140 to hold the at least two outer bolt sections 140a, 140b together. The clamp bolt 160 shown in the illustrated embodiment has an outside surface 163 and an inside surface 164 with screw threads 166. In the illustrated embodiment, similar to a standard mechanical bolt, the clamp bolt 160 is reversible so that the proximal end 161 and distal end 162 can be switched without affecting the operability of the clamp bolt 160. In some embodiments, the clamp bolt 160 has a smooth inside surface 164 without screw threads 166. In embodiments with a smooth inside surface 164, the clamp bolt 160 cooperatively interacts with the clamping region of the split outer bolt 140 by friction or an interference fit. The embodiment illustrated in FIG. 2 has a clamping region 153 with a hexagonally shaped outer surface 143. A clamp bolt 160 of some embodiments has a shape configured to clamp around the faces of the hexagonal shaped surface. The clamp bolt 160 of some embodiments has a similar shape (i.e., hexagonal). In some embodiments, the clamp bolt 160 contacts opposite sides of the clamping region 153 to apply compressive force to hold the outer bolt sections together. For example, a C-clamp can be clamped to opposing surfaces of the clamping region 153. In some embodiments, the clamping region 153 includes a flange extending outwardly from the outer surface. The flange has an opening configured to allow a bolt or other fastener to pass through adjoined outer bolt sections to hold the sections together.

The inner bolt 120, split outer bolt 140 and clamp bolt 160 are made of any suitable material or materials. The different shading used in the Figures is for ease of understanding the relationship between the components and visualizing the interaction and does not imply any particular material of manufacture. In some embodiments, each of the individual components is independently made of a material comprising one or more of metal or plastic. In some embodiments, the metal is one or more of aluminum, nickel, molybdenum or stainless steel. In some embodiments, any or all of the individual components have a metal or friction reducing coating. In some embodiments, the inner bolt 120, split outer bolt 140 and clamp bolt 160 are made of a material comprising stainless steel.

Figure 3A:
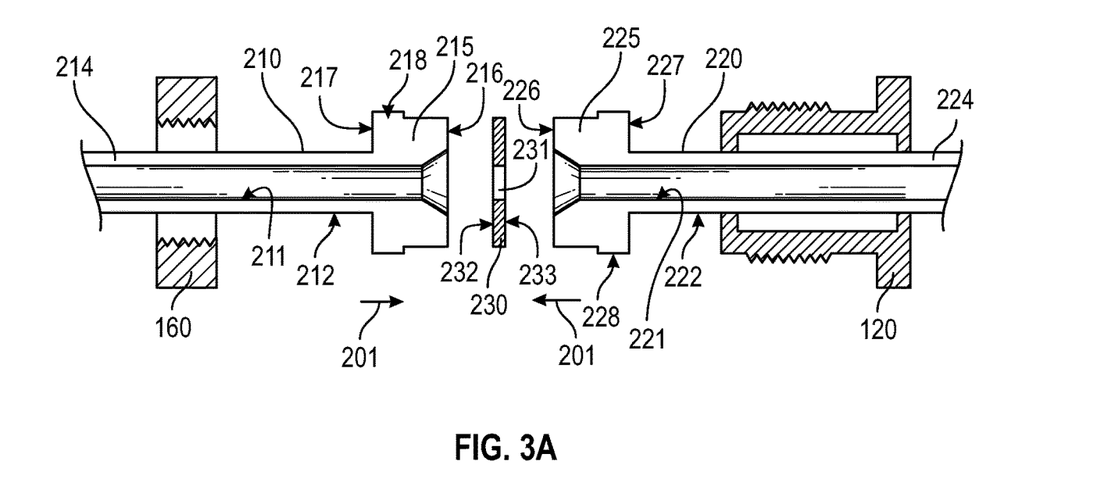
FIGS. 3A through 3F illustrate assembly of a connector assembly and connection of tubes according to one or more embodiment of the disclosure.

Referring to FIGS. 3A through 3F, one or more embodiments of the disclosure are directed to methods of connecting tubes. FIG. 3A illustrates a first tube 210 and a second tube 220 to be connected using one or more embodiment of the disclosure. The first tube 210 has a tube body 214 with an inner surface 211 and an outer surface 212. The first tube 210 has an end 213 with end flange 215. The end flange 215 of some embodiments is integrally formed with the tube body 214. In some embodiments, the end flange 215 is a separate component slidably movable about the tube body 214. In some embodiments, the end flange 215 is welded or affixed to the end of the tube body 214 in a manner that prevents sliding or rotation of the end flange 215 relative to the tube body 214. The end flange 215 of the illustrated embodiment has an end face 216, a back surface 217 and an outer wall 218.

The second tube 220 has a tube body 224 with an inner surface 221 and an outer surface 222. The second tube 220 has an end 223 with end flange 225. The end flange 225 of some embodiments is integrally formed with the tube body 224. In some embodiments, the end flange 225 is a separate component slidably movable about the tube body 224. In some embodiments, the end flange 225 is welded or affixed to the end of the tube body 224 in a manner that prevents sliding or rotation of the end flange 225 relative to the tube body 224. The end flange 225 of the illustrated embodiment has an end face 226, a back surface 227 and an outer wall 228.

Figure 3B:
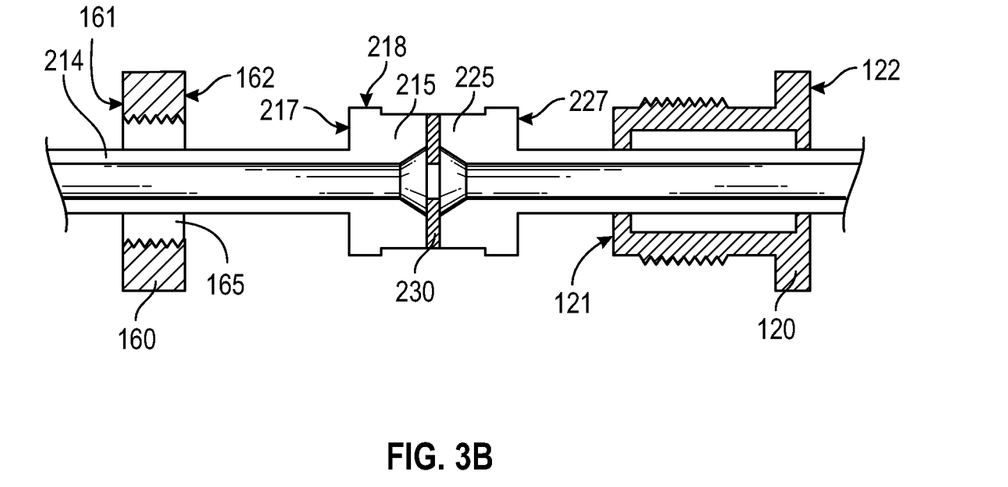

The first tube 210 and second tube 220 are brought together 201 so that the end face 216 of the first tube 210 and the end face 226 of the second tube 220 are facing. In some embodiments, the end face 216 and the end face 226 are in direct contact with each other. As used in this manner, the term "direct contact" means that the surfaces touch without an intervening or intermediate component. In some embodiments, the end face 216 and end face 226 are prevented from direct contact using a gasket 230 with an opening 231 therethrough. In some embodiments, the gasket 230 is a disk-shaped component with a first face 232 and a second face 233 defining a thickness of the gasket 230. The gasket 230 has an outer diameter (OD) and with an opening 231 extending from the first face 232 to the second face 233 defining an inner diameter (ID). In some embodiments, the gasket 230 has a variable compression ratio (VCR) that enables the gasket 230 to conform to the end face 216 and end face 226 so that surface irregularities on the end face 216 are compensated for by contact with the first face 232 and surface irregularities on the end face 226 are compensated for by contact with the second face 233. The gasket 230 of some embodiments is configured to allow an uninterrupted flow of gas from the first tube 210 to the second tube 220, and/or from the second tube 220 to the first tube 210. In some embodiments, the opening 231 in the gasket 230 is larger than the opening in the end of the first tube 210 or second tube 220. FIG. 3B illustrates the embodiment of FIG. 3A after the end face 216 and end face 226 are in contact via gasket 230.

Figure 3C:
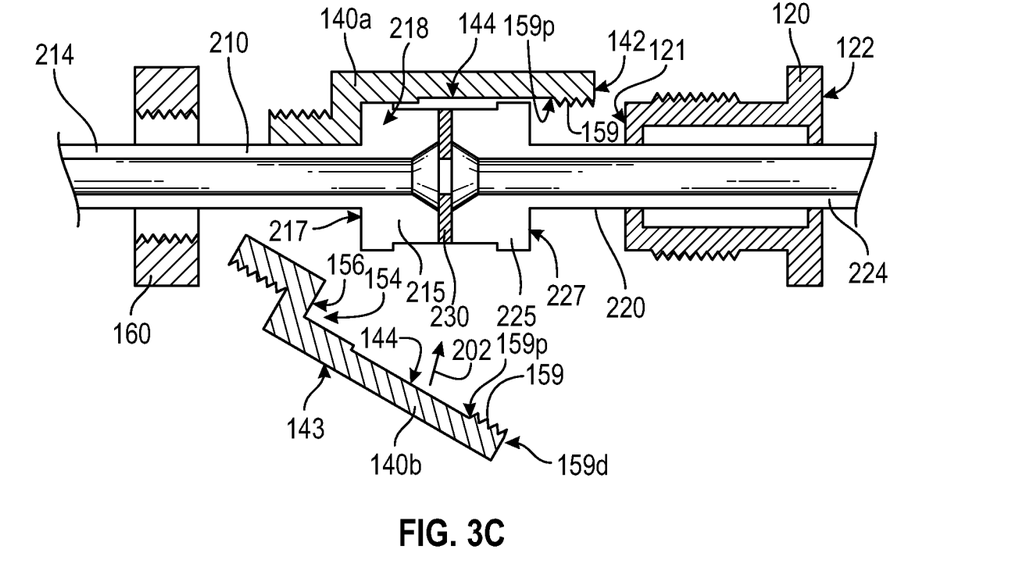

Referring to FIG. 3C, at least two outer bolt sections 140a, 140b are positioned 202 around the end of the first tube 210 and the end of the second tube 220. In the illustrated embodiment, the inner wall 156 of the stepped region 154 is positioned against the back surface 217 of the flange 215 of the first tube 210.

Figure 3D:
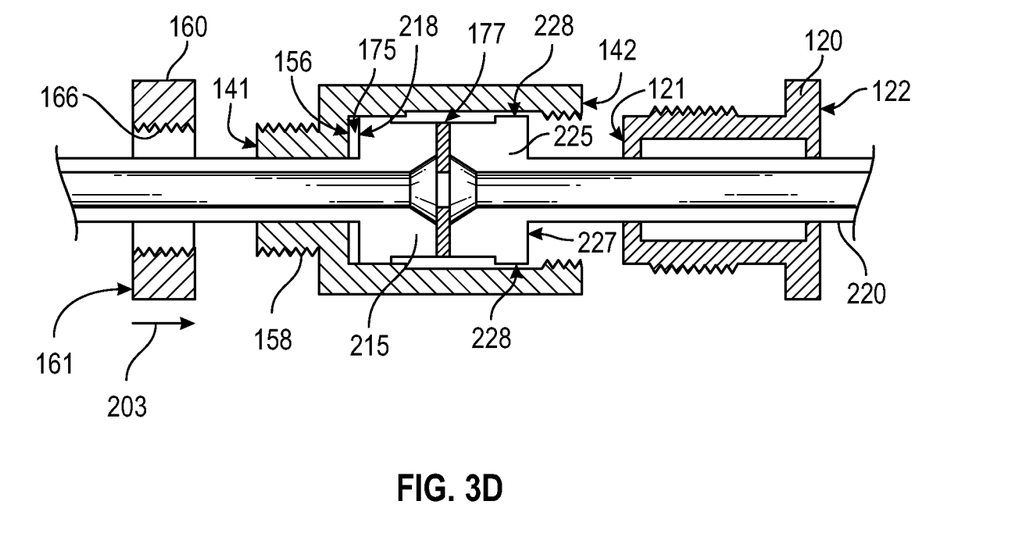

In some embodiments, the outer bolt sections 140a, 140b are positioned around the first tube 210 so that the inner wall 156 is spaced a distance from the back surface 217 of the flange 215. FIG. 3D illustrates an embodiment in which the inner wall 156 is spaced a distance from the back surface 217 of the flange 215 to leave gap 175. The gap 175 can be closed during engagement of the clamp bolt 160, as shown in FIG. 3F.

In some embodiments, as shown in FIG. 3D, a portion of the inside surface 144 of the outer bolt section 140a contacts the outer wall 218 of the flange 215. In some embodiments, the outer bolt section 140 has an inner surface 144 that varies so that a proximal portion of the inner surface 144 directly contacts the outer wall 218 of the flange 215 and distal portion of the inner surface does not contact the outer wall 228 of the flange 225. In some embodiments, the inner surface 144 is configured to form a friction fit around the outer wall 228 so that the assembled split outer bolt 140 resists rotation around the first tube 210 and flange 215 during installation. In some embodiments, the flange 215 has a cross-section with a shape other than a circle. For example, in some embodiments, the cross-section of the flange is pentagonal, hexagonal, oval, elongate like a t-bolt, star shaped, etc. In some embodiments, the shape of the inner surface 144 of the outer bolt sections, and the split outer bolt, are configured to prevent rotation of the split outer bolt relative to the flange. In some embodiments, the shape of at least a portion of the inner surface 144 is concentric to the cross-sectional shape of the flange. As used in this manner, the term "concentric to" means that the relevant portion of the inner surface 144 is shaped so that when placed on the flange, there is a uniform spacing between the flange and the relevant portion of the inner surface. For example, a hexagonal shaped portion of the inner surface would be concentric to a hexagonal shaped flange. In some embodiments, the shape of the inner surface 144 is not concentric to the shape of the flange and prevents rotational movement around the flange. For example, a square shaped inner surface cross-section is not concentric to an octagonal shaped flange even though the square shaped component can be fitted around the octagonal shaped flange when sized appropriately to prevent rotation.

Figure 3E:
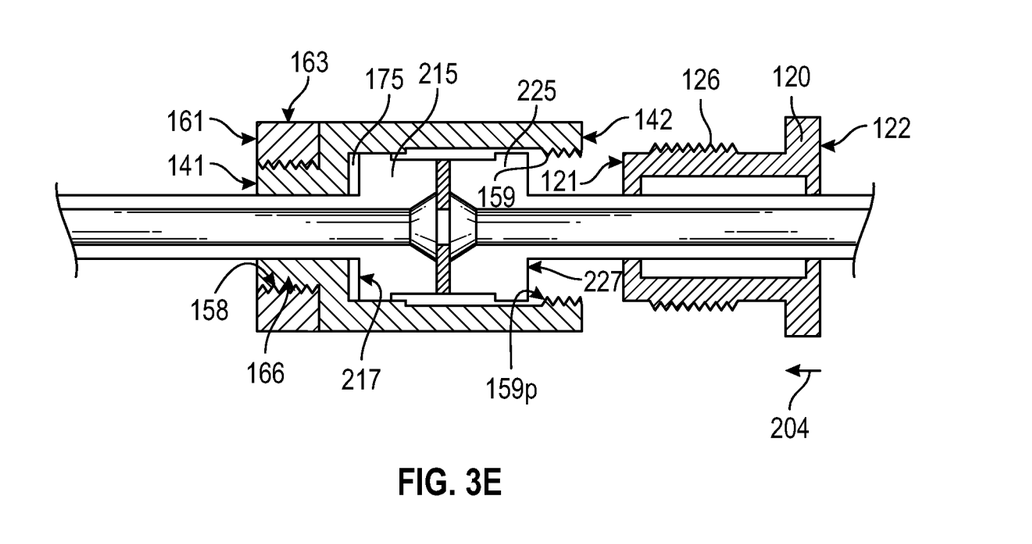
Figure 3F:
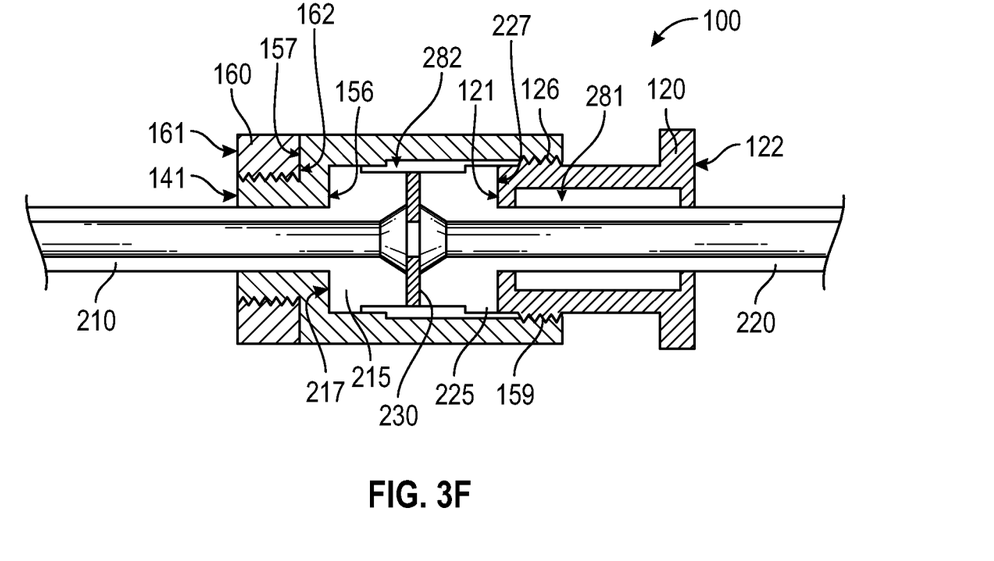

FIG. 3E shows the embodiment of FIG. 3D after distal movement 203 of the clamp bolt 160. The clamp bolt 160 illustrated has screw threads 166 on the inner surface that are configured to cooperatively interact with screw threads 158 on the outer surface of the split outer bolt 140. In this case, the clamp bolt 160 is screwed onto the end of the outer bolt sections 140a, 140b to form a complete split outer bolt 140 which is clamped in position around the first tube 210 and the second tube 220.

With the clamp bolt 160 in place, the split outer bolt 140 encloses both the flange 215 of the first tube 210 and the flange 225 of the second tube 220. The distal end 142 of the split outer bolt 140 is positioned distally of the back surface 227 of the flange 225. In some embodiments, the proximal thread end 159$p$ of the threads 159 are distal to the back surface 227 of the flange 225. In some embodiments, threads 159 extend over a portion of the flange 225 so that the proximal thread end 159$p$ is proximal to the back surface 227 and the distal thread end 159$d$ is distal to the back surface 227. The clamp bolt 160 illustrated is approximately the same length as the threaded portion of the split outer bolt 140. In some embodiments, the clamp bolt 160 is longer than the threaded portion of the split outer bolt 140. In some embodiments, the clamp bolt 160 is shorter than the threaded portion of the split outer bolt 140.

FIG. 3F illustrates the completed connector assembly 100 in use after the inner bolt 120 is screwed into the split outer bolt 140, clamping the end flange 215 of the first tube 210 to an end flange 225 of the second tube 220 according to one or more embodiment. The process of screwing the inner bolt 120 into the split outer bolt 140 causes the proximal end 121 of the inner bolt 120 to contact the back surface 227 of flange 225. Pushing flange 225 against the gasket 230 and flange 215 forces the back surface 217 of flange 215 to close any remaining gap 175 and contact the inner wall 156.

In some embodiments, the inner bolt 120 and/or split outer bolt 140 are loosely fitting around the first tube 210 and/or second tube 220 so that the primary forces are due to contacts between the back surfaces 217 and inner wall 156 and between back surface 227 and proximal end 121. In the illustrated embodiment, portions of the inner bolt 120 are spaced from the second tube 220 to form gap 281, and portions of the split outer bolt 140 are spaced from the flange 215 and/or flange 225 to form gap 282. In some embodiments, the inner bolt 120 and/or split outer bolt 140 fit snugly around the first tube 210 and/or second tube 220 so that proximal or distal movement along the tubes is hindered by frictional contact.

The first tube 210 and second tube 220 can be separated by reversing the process illustrated in FIGS. 3A through 3F.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. In one or more embodiments, the particular features, structures, materials, or characteristics are combined in any suitable manner.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A connector assembly comprising:
   an inner bolt having a proximal end and a distal end defining an inner bolt length, an outside surface, an opening extending from the proximal end to the distal end, the opening having an inside surface, and screw threads on the outside surface extending a screw thread length from a proximal thread end to a distal thread end, the proximal thread end of the inner bolt is spaced a distance from the proximal end of the inner bolt;
   a split outer bolt comprising at least two outer bolt sections configured to form a cylindrical bolt with an inside surface and an outside surface, each of the bolt sections having a bolt section proximal end and a bolt section distal end defining a bolt section length, a bolt section inside surface and a bolt section outside surface, bolt section inner screw threads on the bolt section inside surface, the bolt section inner screw threads configured to form continuous inner screw threads on the inside surface of the split outer bolt, the continuous inner screw threads configured to cooperatively interact with the screw threads on the outside surface of the inner bolt, bolt section outer screw threads on the bolt section outside surface, the bolt section outer screw threads configured to form outer screw threads on the outside surface of the split outer bolt; and
   a clamp bolt comprising an inner surface with inner screw threads configured to cooperatively interact with the outer screw threads on the outside surface of the split outer bolt to hold the at least two outer bolt sections together to form the cylindrical bolt, the clamp bolt holding the bolt sections of the split outer bolt together by engaging the proximal ends of the bolt sections.

2. The connector assembly of claim 1, wherein the distal thread end of the inner bolt is spaced a distance from the distal end of the inner bolt.

3. The connector assembly of claim 1, wherein the inside surface of the inner bolt has an inner wall adjacent the proximal end in an inner wall region, the inner wall angled relative to the inside surface so that an inner diameter of the opening within the inner wall region is smaller than an inner diameter of the opening distal of the inner wall region.

4. The connector assembly of claim 3, wherein the proximal thread end of the threads on the outside surface of the inner bolt positioned distally relative to the distal end of the inner bolt from the inner wall region.

5. The connector assembly of claim 1, wherein the outer bolt sections are configured to form a continuous inside surface around an axis extending from the distal end to the proximal end of the split outer bolt.

6. The connector assembly of claim 5, wherein the inner screw threads extend from a distal thread end to a proximal thread end.

7. The connector assembly of claim 6, wherein the distal thread end of the inner screw threads of the split outer bolt is adjacent the distal end of the split outer bolt.

8. The connector assembly of claim 5, wherein the inside surface of the outer bolt sections comprise a inner wall spaced a distance from the proximal end of the outer bolt section so that an inner diameter of the split outer bolt proximal of the inner wall is smaller than an inner diameter of the split outer bolt distal of the inner wall.

9. The connector assembly of claim 5, wherein the outside surface of the outer bolt sections comprise an outer wall spaced a distance from the proximal end of the outer bolt sections so that an outer diameter of the split outer bolt proximal the outer wall is smaller than an outer diameter of the split outer bolt distal of the outer wall.

10. The connector assembly of claim 9, wherein the bolt section outer screw threads on the bolt section outside surface is proximal to the outer wall, and the bolt section outer screw threads configured to form outer screw threads on the outside surface of the split outer bolt proximal the outer wall.

11. The connector assembly of claim 10, wherein the outer screw threads extend from the proximal end of the split outer bolt to the outer wall of the split outer bolt.

12. The connector assembly of claim 1, wherein the outer screw threads extend an outer screw thread length from the proximal end of the split outer bolt.

13. The connector assembly of claim 1, wherein the inner bolt, split outer bolt and clamp bolt are made of a material comprising stainless steel.

14. A connector assembly comprising:
an inner bolt having a proximal end and a distal end defining an inner bolt length, an outside surface, an opening extending from the proximal end to the distal end, the opening having an inside surface, and screw threads on the outside surface extending a screw thread length from a proximal thread end to a distal thread end, the inside surface having an inner wall adjacent the proximal end in an inner wall region, the inner wall angled relative to the inside surface so that a diameter of the opening within the inner wall region is smaller than an inner diameter of the opening distal to the inner wall region, the proximal thread end of the inner bolt is spaced a distance from the proximal end of the inner bolt;
a split outer bolt comprising at least two outer bolt sections configured to form a cylindrical bolt with a continuous inside surface and an outside surface, each of the bolt sections having a bolt section proximal end and a bolt section distal end defining a bolt section length, a bolt section inside surface and a bolt section outside surface, bolt section inner screw threads on the bolt section inside surface, the bolt section inner screw threads configured to form continuous inner screw threads on the inside surface of the split outer bolt that is configured to cooperatively interact with the screw treads on the outside surface of the inner bolt; and
a clamp bolt configured to cooperatively interact with the proximal end outside surface of the split outer bolt to hold the at least two outer bolt sections together to form the cylindrical bolt.

15. The connector assembly of claim 14, further comprising a bolt section outer screw threads on the bolt section outside surface, the bolt section outer screw threads configured to form outer screw threads on the outside surface of the split outer bolt, and the clamp bolt comprises an inner surface with inner screw threads configured to cooperatively interact with the outer screw threads on the outside surface of the split outer bolt.

16. The connector assembly of claim 15, wherein the outside surface of the outer bolt sections comprise an outer wall spaced a distance from the proximal end of the outer bolt sections so that an outer diameter of the split outer bolt proximal the outer wall is smaller than an outer diameter of the split outer bolt distal of the outer wall.

17. The connector assembly of claim 16, wherein the bolt section outer screw threads are positioned on the bolt section outside surface proximal to the outer wall, the bolt section outer screw threads configured to form outer screw threads on the outside surface of the split outer bolt proximal the outer wall.

18. A method of connecting tubes, the method comprising:
positioning at least two outer bolt sections of a split outer bolt around an end of a first tube and end of a second tube, the outer bolt sections configured to form a continuous inside surface with continuous inner screw threads, each of the at least two outer bolt sections having a bolt section proximal end and a bolt section distal end defining a bolt section length so that when the at least two outer bolt sections are positioned around the first tube and second tube, the proximal ends form a proximal end portion of the split outer bolt;
a clamp bolt configured to cooperatively interact with the proximal end outside surface of the split outer bolt to hold the at least two outer bolt sections together to form the cylindrical bolt;
positioning the clamp bolt around the proximal end portion of the split outer bolt; and
screwing an inner bolt around the end of the second tube into the split outer bolt to clamp an end flange of the first tube to an end flange of the second tube, the inner bolt having a proximal end and a distal end defining an inner bolt length, an outside surface, an opening extending from the proximal end to the distal end, the opening having an inside surface, and screw threads on the outside surface extending a screw thread length from a proximal thread end to a distal thread end, the inside surface having an inner wall adjacent the proximal end in an inner wall region, the inner wall angled relative to the inside surface so that a diameter of the opening within the inner wall region is smaller than an inner diameter of the opening distal to the inner wall region, the proximal thread end of the inner bolt is spaced a distance from the proximal end of the inner bolt.

* * * * *